US005915484A

United States Patent [19]

Hsieh

[11] Patent Number: 5,915,484

[45] Date of Patent: Jun. 29, 1999

[54] TOOL HEAD STRUCTURE OF POWER SCREWDRIVER

[76] Inventor: An-Fu Hsieh, 5F, No. 79, Kuei-Hsin Rd., Pan-Chaio City, Taipei Hsien, Taiwan

[21] Appl. No.: 09/205,572

[22] Filed: Dec. 4, 1998

[51] Int. Cl.$^{6}$ ...... B23Q 5/00

[52] U.S. Cl. ...... 173/176; 173/93; 173/93.5

[58] Field of Search ...... 173/93, 93.5, 176, 173/178, 179, 93.6

[56] References Cited

U.S. PATENT DOCUMENTS

| | | | |
|---|---|---|---|
| 4,947,939 | 8/1990 | Hung | 173/93 |
| 5,379,851 | 1/1995 | Huang | 173/93 |
| 5,435,397 | 7/1995 | Juan | 173/93.5 |
| 5,673,758 | 10/1997 | Sasaki et al. | 173/178 |
| 5,740,892 | 4/1998 | Huang | 173/93 |
| 5,839,518 | 11/1998 | Setsuko | 173/176 |

*Primary Examiner*—Scott A. Smith
*Attorney, Agent, or Firm*—Dougherty & Troxell

[57] ABSTRACT

A tool head structure of power screwdriver, including an engaging clutch device for indirectly controlling the rotation of a driven member. The clutch device includes weight blocks which are subject to centrifugal force and thrown outward so as to indirectly press the leaf springs to further press the brake blocks. The brake blocks extend into an inner annular section of the rotary seat to drivingly engage with the driven member in the rotary seat. Therefore, when the rotary seat is coupled with a motor, at low rotational speed, simply the rotary seat is rotated. However, when the rotary seat reaches a certain high rotational speed, the weight blocks are subject to centrifugal force to indirectly press the brake blocks to drivingly engage with the driven member, whereby the driven member is rotated to tighten or untighten the screw.

8 Claims, 9 Drawing Sheets

TOOL HEAD STRUCTURE OF POWER SCREWDRIVER

BACKGROUND OF THE INVENTION

The present invention relates to a tool head structure of power screwdriver, which includes less parts and can be easily manufactured and assembled. The tool head structure can be durably used with better driving effect and can be easily carried. The tool head structure is applicable to power tools such as power screwdriver for tightening and untightening car tire screws.

Power tools are widely used in various fields to facilitate operation and save time and labor. For example, a power socket wrench is used to untighten and tighten the screws (nuts) of a car tire to facilitate detacment and installation of the car tire. In the power socket wrench, the socket is driven by a motor via a driving mechanism so as to easily tighten and untighten the screws or nuts.

FIG. 10 shows a clutch and driving mechanism of a conventional power screwdriver, including a base 10, a driving member 20, a driven member 30, a pivot shaft 40, a clutch 50 and two pin members 60. The base 10 is formed with a central hole 100. The wall of the base 10 is formed with a notch 101 communicating with the central hole 100. The clutch 50 is disposed with a front panel 51 for connecting the clutch 50 with one end of the base 10. An output shaft of a motor is coupled with the clutch for driving the base to rotate. The driving member 20 is formed as an arch block and pivotally connected with upper portion of the notch 101 via the pivot shaft 40. The driving member 20 is freely swingable about the pivot shaft 40 in the notch 101. The front end of the driven member 30 is formed with tooth blocks 301. The rear end of the driven member 30 is disposed with a square connector for connecting with the socket. The tooth blocks 301 are positioned into the central hole 100 of the base 10. Each pin member 60 is formed with an annular groove 601. The front panel 51 of the clutch 50 is formed with two slots 501. The pin members 60 are fitted into the slots 501 at the annular grooves 601 and extended into the through holes 102 of the base. In normal state, the pin members 60 are locked at lower end of the driving member 20. After the clutch 30 is rotated at high speed, the pin members 60 are backward retracted into the through holes 102 of the base 10. During swinging, two ends of the driving member 20 collide the driven member 30 in the central hole so as to rotate the driven member 30 and indirectly drive the socket.

According to the above arrangement, when the driving member 20 collides the tooth blocks 301 of the driven member 30, the driving member 20 will suffer a reaction force which forms a shear force exerted onto the pivot shaft 40. This may lead to damage of the pivot shaft.

SUMMARY OF THE INVENTION

It is a primary object of the present invention to provide a tool head structure of power screwdriver, which includes less parts and can be easily manufactured and assembled. The tool head structure can be durably used with very high driving effect.

According to the above object, the tool head structure of power screwdriver of the present invention includes an engaging clutch device, a driven member and a housing enclosing the clutch device and the driven member. The clutch device serves to indirectly control the rotation of a driven member. One end of the driven member is disposed with an engaging block. The driven member is filled in an inner annular section of the rotary seat. Two brake blocks are pressed by springs and leaf springs and forcedly installed in slide ways of upper end of the inner annular section of the rotary seat via weight blocks in cooperation with the springs. When the rotary seat is coupled with a motor of the power tool, at low rotational speed, simply the rotary seat is rotated. However, when the rotary seat reaches a certain high rotational speed, the weight blocks are subject to centrifugal force to indirectly press the leaf springs and the brake blocks to make the brake blocks extend into the inner annular section of the rotary seat and drivingly engage with the driven member. Therefore, the driven member is rotated to tighten or untighten the screw.

The present invention can be best understood through the following description and accompanying drawings, wherein:

BRIEF DESCRIPTION OF THE DRAWINGS

FIG. 3-1 is a sectional view of the weight block of the present invention;

FIG. 6-1 shows the relationship between the brake block and rotary seat of the clutch device of the present invention, showing that the brake block does not extend into the rotary seat;

FIG. 6-2 shows the relationship between the brake block and rotary seat of the clutch device of the present invention, showing that the brake block extends into the rotary seat;

DETAILED DESCRIPTION OF THE PREFERRED EMBODIMENTS

Figure 1:
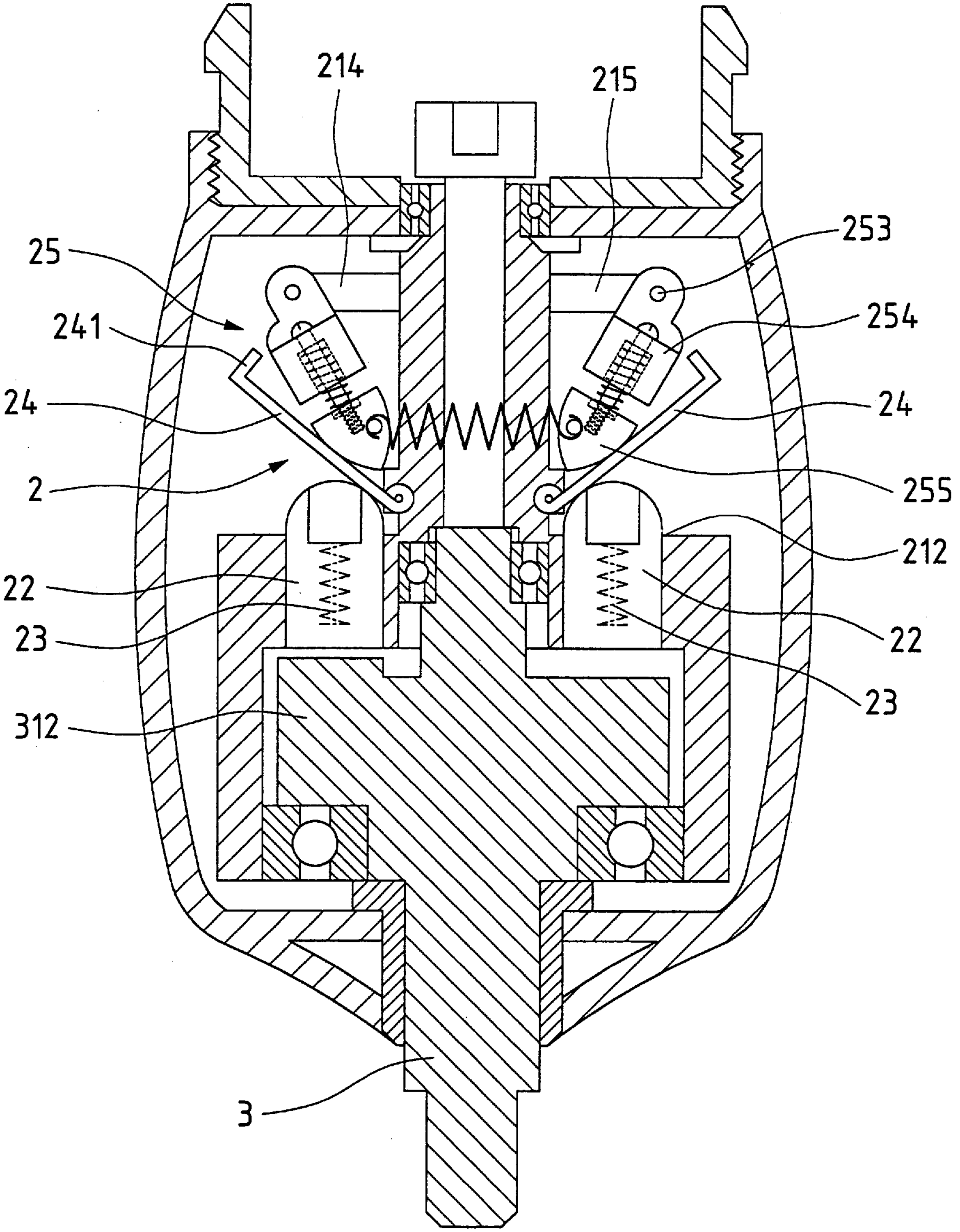
FIG. 1 is a sectional assembled view of the tool head of the present invention.

Please refer to FIG. 1. The tool head 1 of the present invention includes a housing 1, an engaging clutch device 2 and a driven member 3. The clutch device 2 includes a rotary seat 21, brake blocks 22, brake block springs 23, leaf springs 24, weight blocks 25 and extension spring 26.

Figure 2:
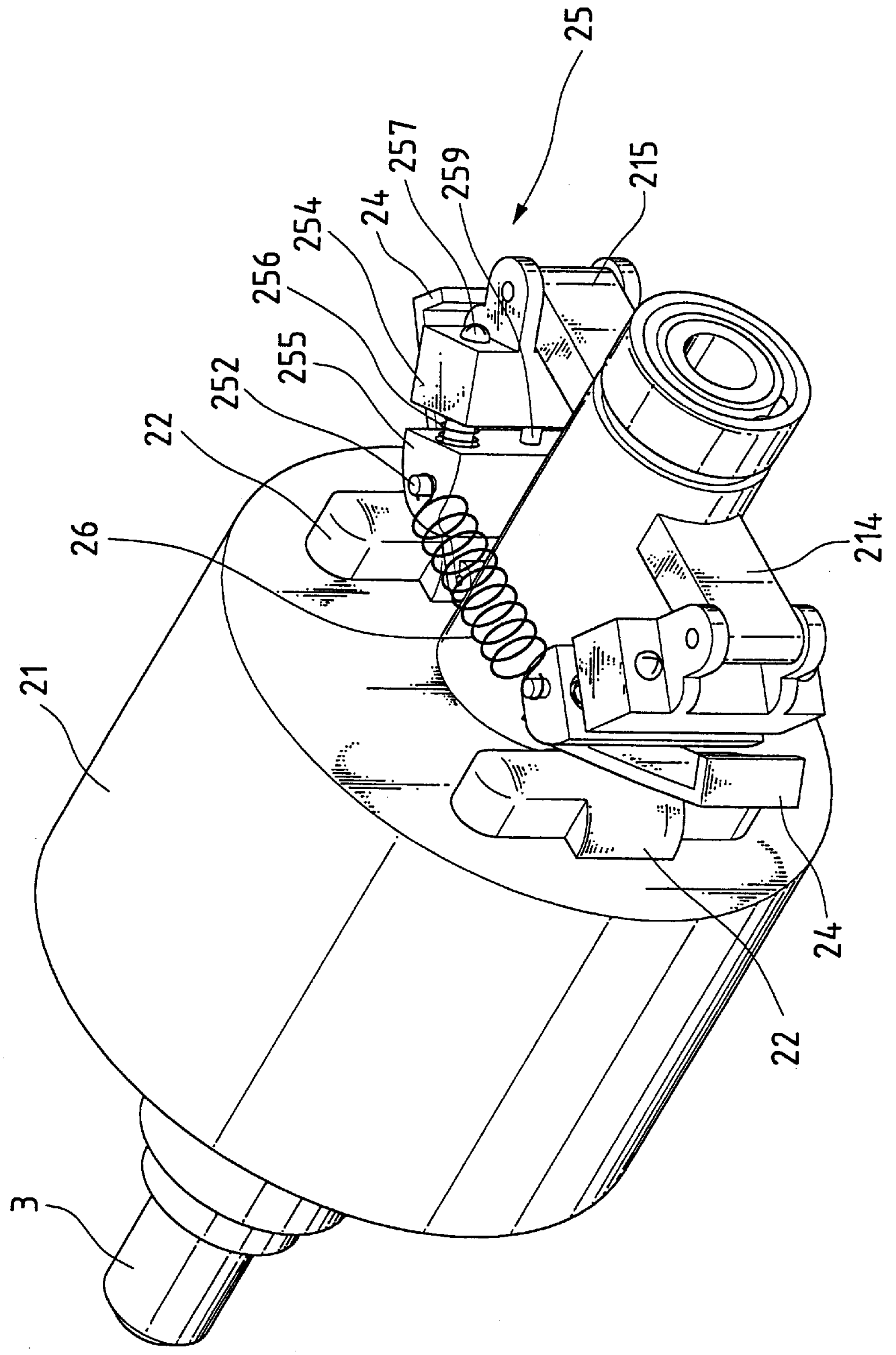
FIG. 2 is a perspective assembled view of the engaging clutch device of the present invention.
Figure 3:
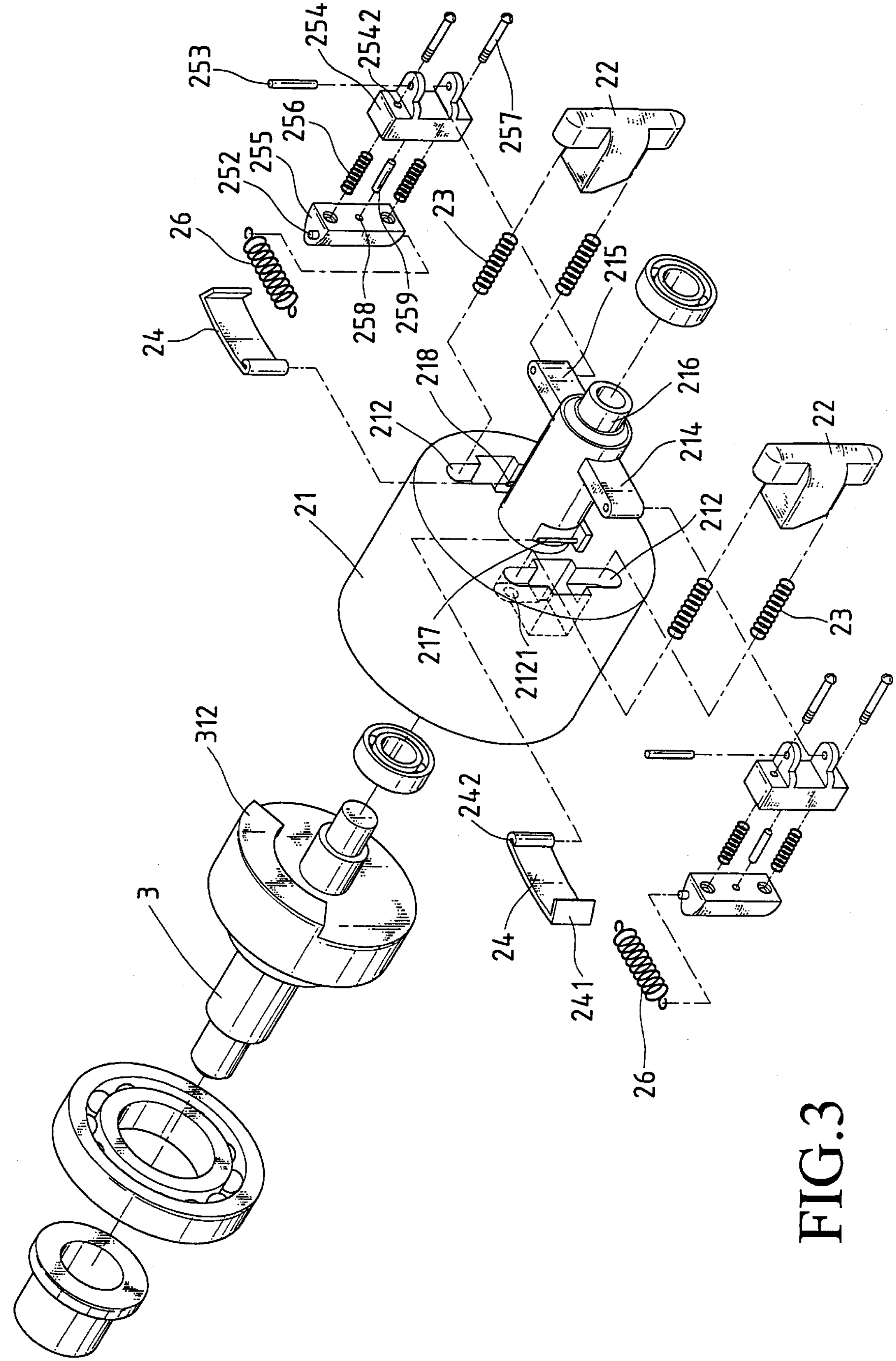
FIG. 3 is a perspective disassembled view of the engaging clutch device of the present invention.
Figures 1, 3:
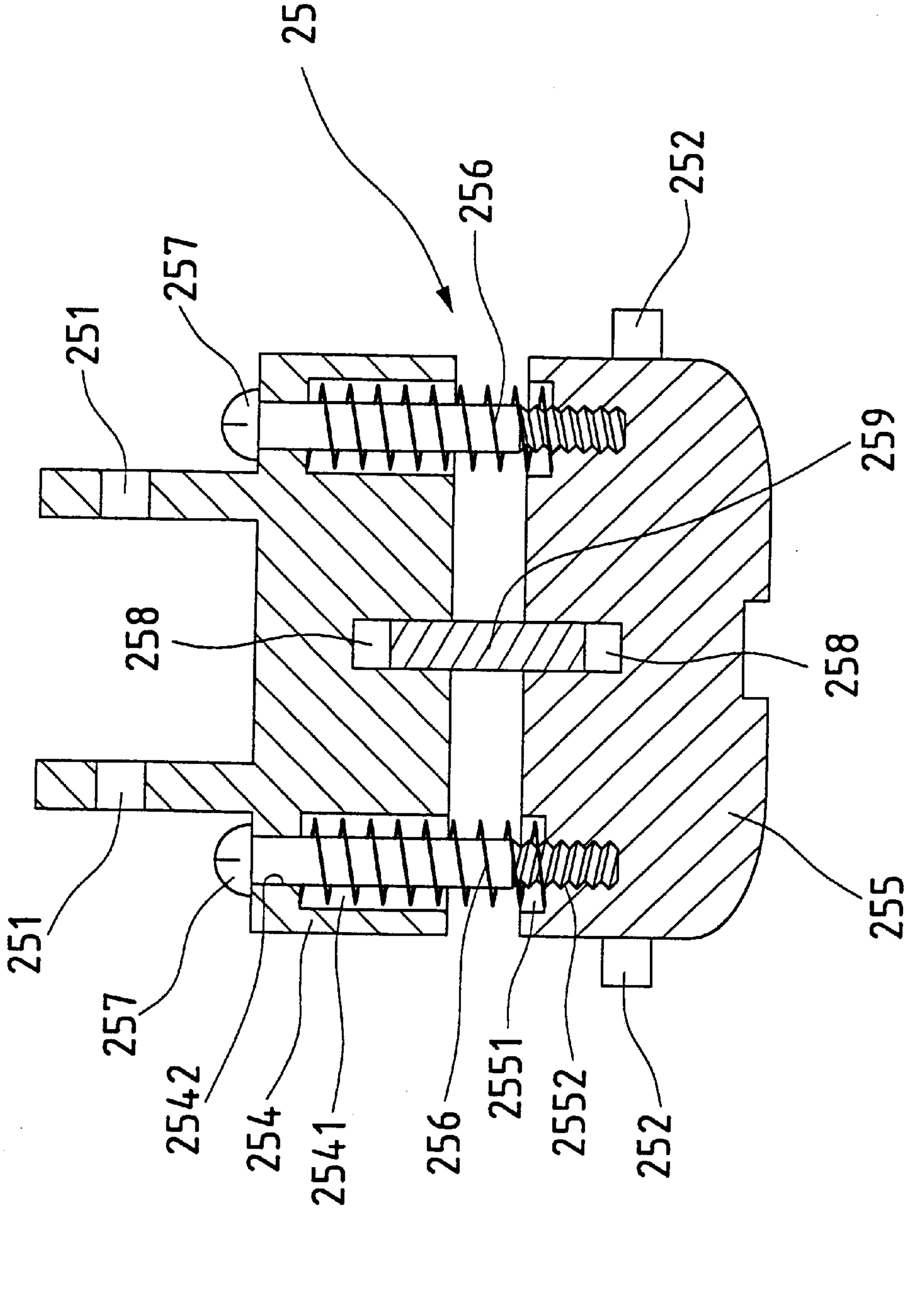

Referring to FIGS. 2 and 3, the rotary seat 21 is formed with an inner annular section 211 and two slide ways 212 passing through the inner annular section 211. As shown in FIG. 3, two sides of the slide way are disposed with engaging boards 2121 disposed with the brake block springs 23. One end of the rotary seat is disposed with an extending rotary shaft 213. At a certain length of the rotary shaft is disposed laterally extending locating arms 214, 215. The end of the rotary shaft is formed with a stepped section 216. Pin members 217, 218 are disposed on the rotary shaft near the slide ways 212.

The brake block 22 has a profile corresponding to that of the slide way 212. The brake block 22 is formed with a slope block body 221. Two sides of the slope block body 221 are formed with projecting blocks 222 for pressing the brake block springs 23.

The leaf spring 24 is an arched plate disposed with a hook section 241 and a pin hole 242.

Referring to FIG. 3-1, the weight block 25 includes an upper half block 254 and a lower half block 255 which are respectively formed with corresponding cavities 2541, 2551. The cavity 2541 of the upper half block 254 is communicated with a narrowed through hole 2542. The wall of the cavity 2551 of the lower half block 255 is formed with a thread section 2552. After placing a spring 256 into the cavity, a bolt 257 is passed through the through hole 2542 to screw with the thread section 2552 so as to mate the upper and lower half blocks. In addition, the two half blocks are formed with locating sockets 258 in which a locating pin 259 is positioned. An upper end of the upper half block 254 is formed with a pin hole 251. Two sides of lower end of the lower half block 254 are disposed with two engaging bosses 252. A pin member 253 is passed through the locating arm 214 and the pin holes 251 so as to swingably locate the weight block 25 on the locating arms 214, 215. Two ends of the extension spring 26 are hooked on the engaging bosses 252 of the weight blocks 25 on two sides of the rotary seat 21, whereby in normal state, the two weight blocks are adjacent to each other.

When assembled, the projecting block 222 of the brake block 22 presses the spring 23 into the slide way 212. The spring 23 cooperates with the engaging boards 2121 on two sides of the slide way to support and resiliently lift the brake block 22. The leaf spring 24 is pivotally connected with the rotary shaft 213 via the pin members 217, 218 and the pin hole 242. The weight block 25 is pivotally connected with the locating arms 214, 215 via the pin member 253 and hooked with the spring 26 so as to form the clutch device 2 of the present invention.

Figure 5:
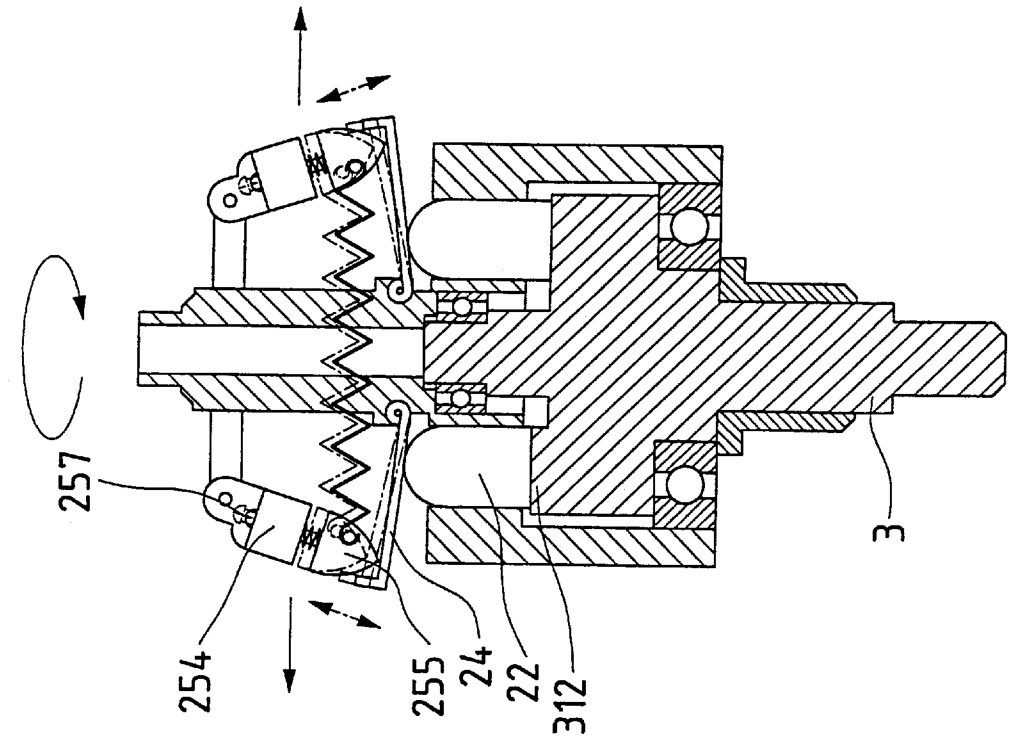
FIG. 5 is a sectional view of the clutch device of the present invention after operation.
Figure 4:
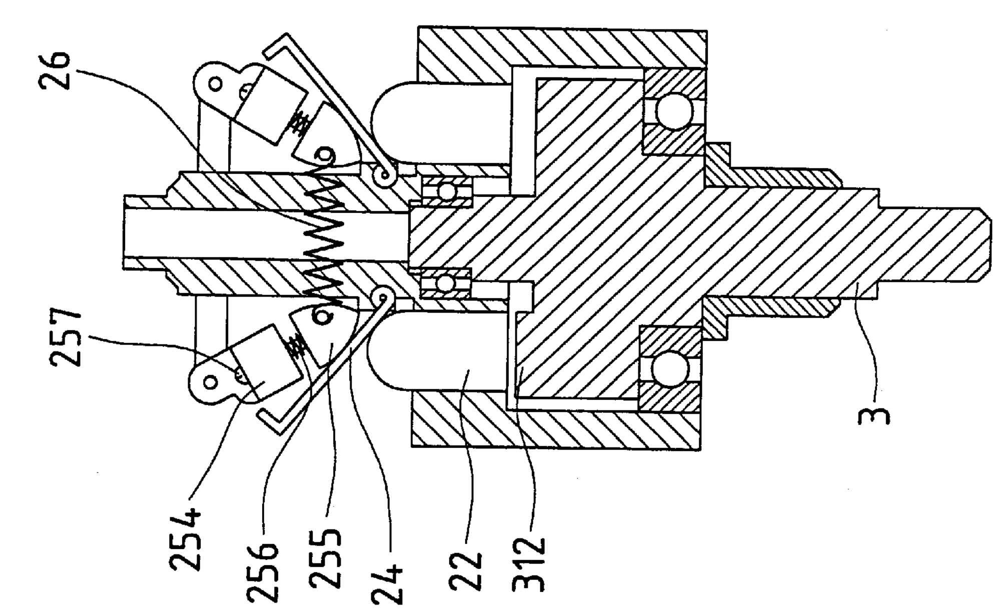
FIG. 4 is a sectional view of the clutch device of the present invention prior to operation.
Figures 2, 6:
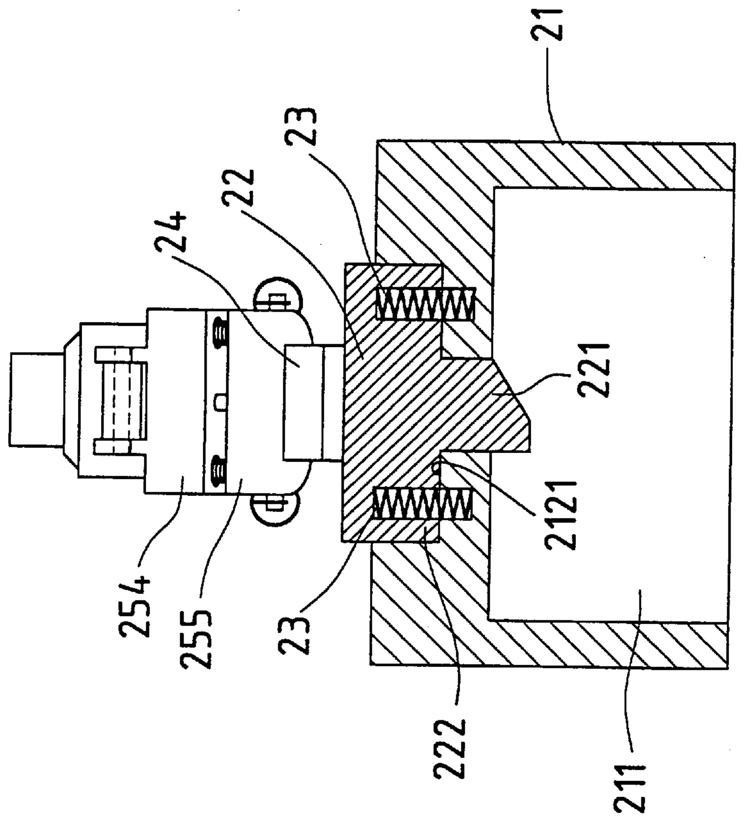
Figures 1, 6:
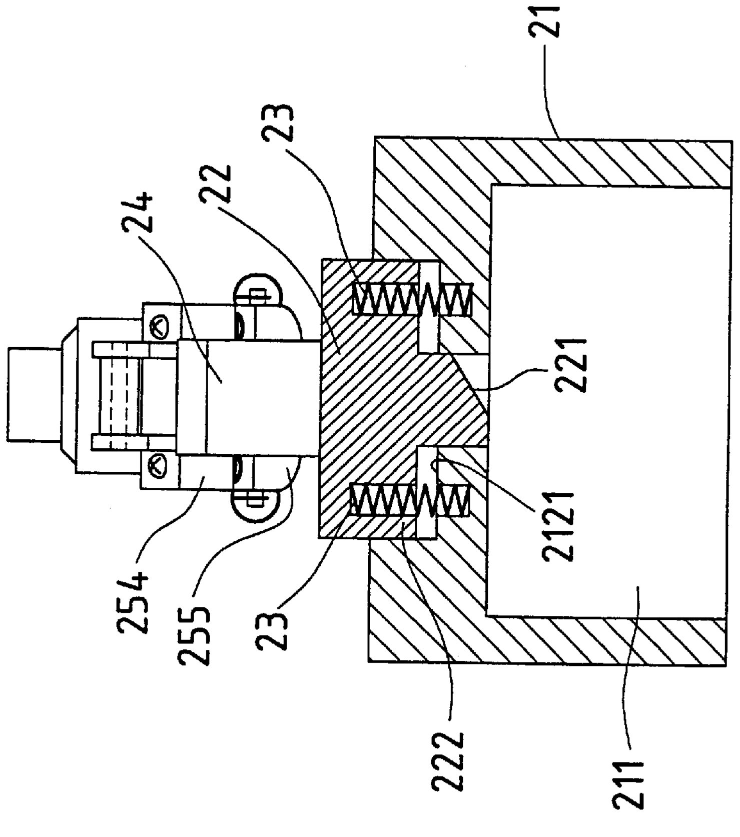

Please refer to FIGS. 4 to 6, wherein FIG. 4 shows that the clutch device 2 is not rotated in a normal state. The two brake blocks 22 are lifted by the spring 23 into the slide ways 212. At this time, the rotary shaft 213 is coupled with the motor. At a low rotational speed, the rotary seat 21 will self-rotate without engaging with the driven member 3. As shown in FIG. 5, when the rotary seat 21 is rotated to a higher speed, due to centrifugal force, the weight blocks 25 are synchronously respectively thrown outward. Therefore, the long end of the body thereof expectedly presses the leaf spring 24 to indirectly depress the brake block 22 to extend into the inner annular section 211 of the rotary seat 21.Referring to FIG. 6, the brake blocks 22 are formed with slope blocks 221 opposite to each other (as shown in FIGS. 8 and 9).

Referring to FIGS. 1 and 3, the rotary shaft 31 is disposed at the center of the driven member 3. The end of the rotary shaft is disposed with a stepped section 311. A bearing 32 is fitted on the stepped section 311 and filled into the hole of the inner annular section 211 of the rotary seat 21. In addition, a large bearing 33 is fitted on the other end of the driven member 3. The driven member 3 is fitted with a collar 34 and installed in the housing 1. One end face of the driven member 3 proximal to the brake block 22 is disposed with an arch engaging block 312.

Figure 9:
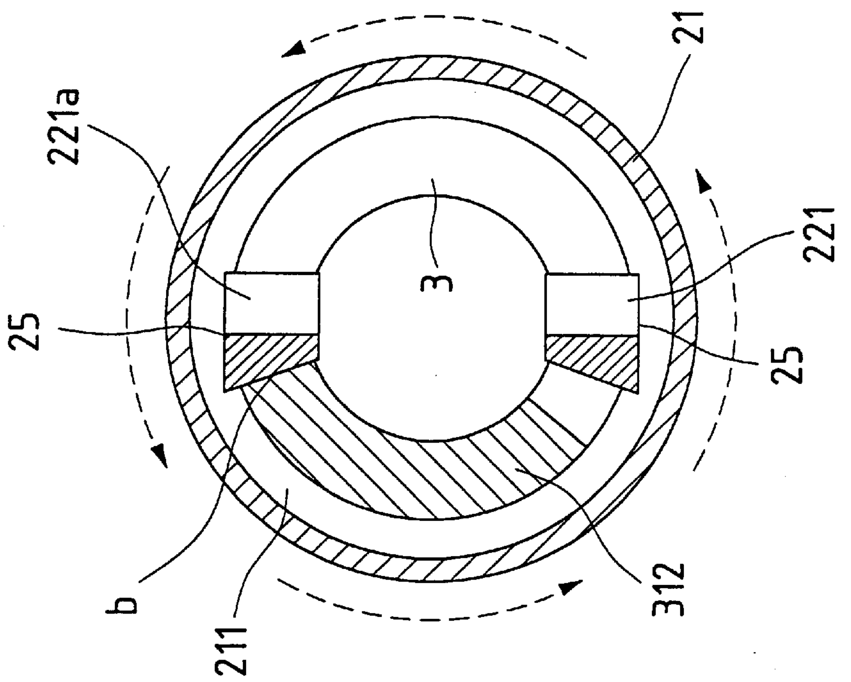
FIG. 9 shows that the brake block counterclockwisely drives the driven member.
Figure 8:
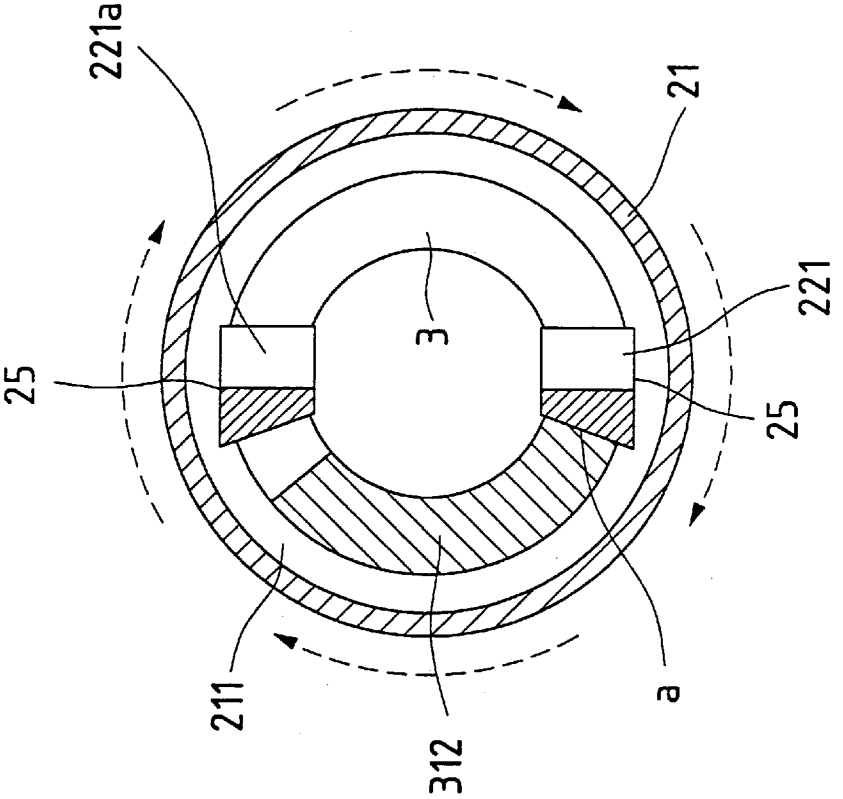
FIG. 8 shows that the brake block clockwisely drives the driven member.
Figure 10:
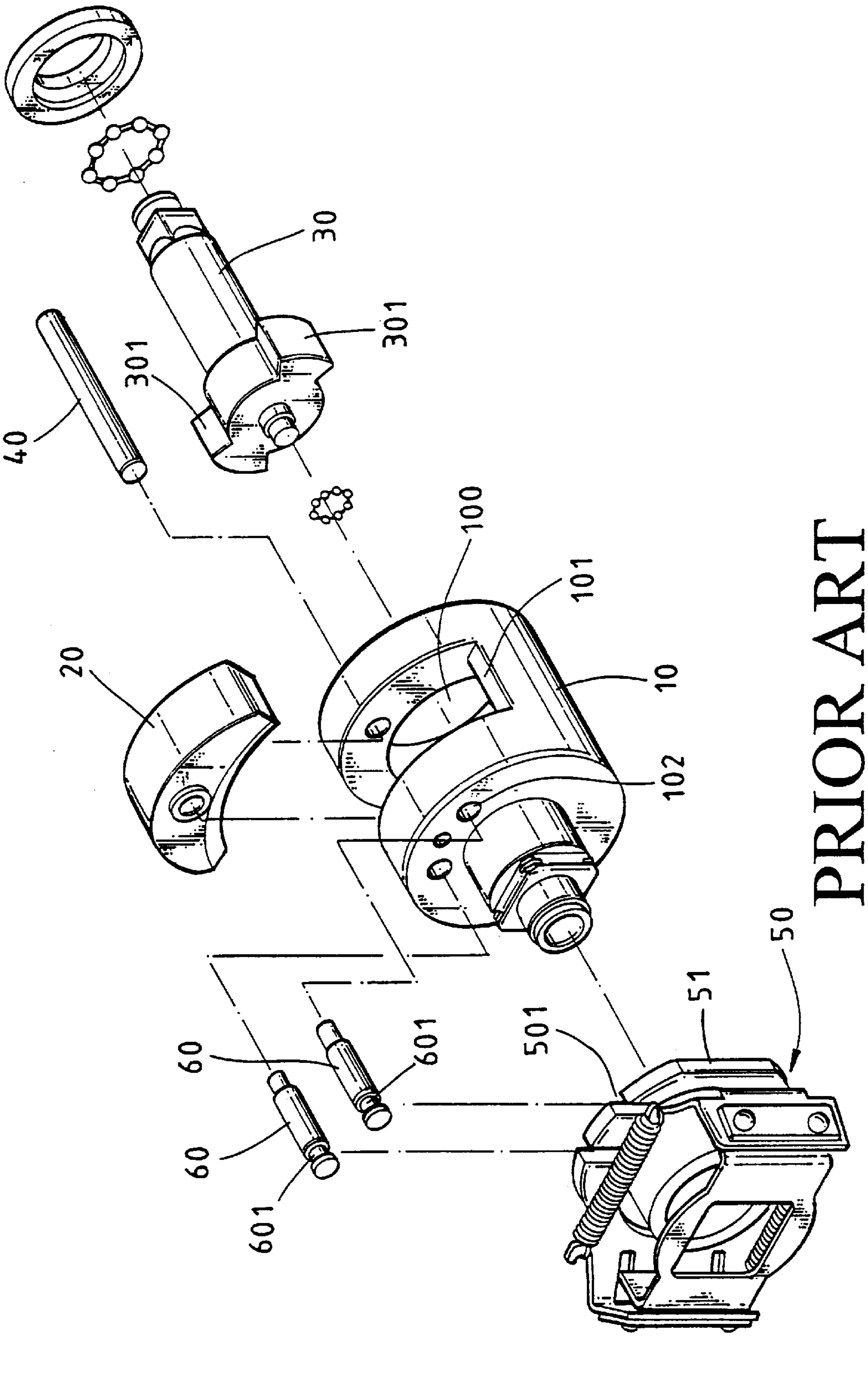
PRIOR ART FIG.10
FIG. 10 is a perspective exploded view of the clutch and driving device of a conventional power tool.

Referring to FIGS. 8 and 9, after the weight block 25 is pressed downward due to high speed rotation of the rotary seat 21, the slope block 221 at the center of the brake block 22 will extend into the inner annular section 211. At this time, the slope block 221 will collide the engaging block 312 of the driven member 3. By means of the design of the slope block 221, the brake block 22 will instantaneously retract. After the engaging block 312 slides into the space between the two brake blocks 22 along the slope block 221, the rotary seat 21 is drivingly engaged with the driven member 3 to provide the torque for tightening or untightening a screw.

The driving engagement between the rotary seat 21 and the driven member 3 is achieved in such a manner that the slope blocks 221 of the brake blocks 22 are oppositely arranged with different rotary directions. Therefore, when the driven member 3 is driven clockwisely (as shown in FIG. 8), the engaging block 312 of the brake block 3 will slide over the slope block 221*a* and is engaged with the back engaging section a of the slope block 221 as shown in FIG. 8 to achieve the driving engagement. Reversely, as shown in FIG. 9, in the case of counterclockwise rotation, after the engaging block 312 of the driven member 3 slides over the slope block 221, the engaging block 312 will engage with the back engaging section b of the slope block 221*a* to achieve the driving engagement so as to buffer the collision force of the brake block 22 onto the engaging block 312 of the driven member 3.

Referring to FIGS. 3-1, 4 and 5, under high speed rotation of the rotary seat 21, the weight blocks 25 in the brake blocks 22 will suffer centrifugal force and be thrown away to compress the leaf springs 24. Thereafter, via the leaf springs 24, the force is transmitted to press the brake block 22, making the slope block 221 descend to collide the engaging block 312 of the driven member 3. At this time, a reaction force is exerted onto the brake block 22. The weight block 25 is designed to have separate upper and lower half blocks 254, 255 so that under high speed rotation of the rotary seat 21, by means of the centrifugal depression force of the locating arms 214, 215, a trend of compression of the weight blocks 25 is indirectly absorbed by the springs 255 in the weight blocks 25. Therefore, the leaf springs 24 are prevented from being compressed and bent and deformed so as to prolong the using life.

Figure 7:
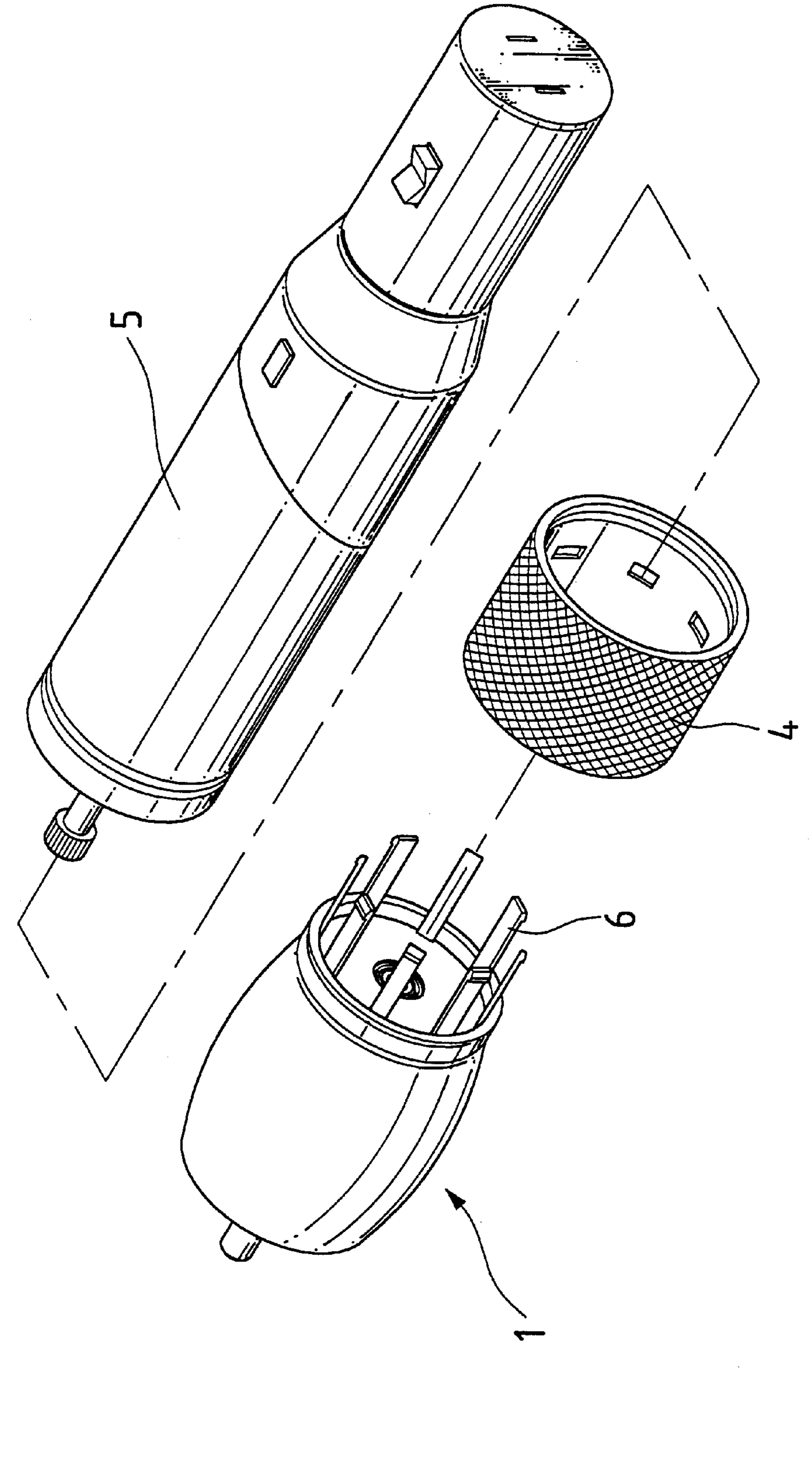
FIG. 7 is a perspective exploded view showing that the tool head of the present invention is disposed with resilient claws for connecting with a lock ring and main body to form a complete power tool.

Referring to FIG. 7, the tool head 1 of the present invention is coupled with a lock ring 4 and a main body 5. The end of the tool head is disposed with resilient latch claws 6 for connecting the tool head with the main body 5 enclosing a motor to form an electric power tool.

It should be noted that the above description and accompanying drawings are only used to illustrate some embodiments of the present invention, not intended to limit the scope thereof Any modification of the embodiments should fall within the scope of the present invention.

What is claimed is:

1. A tool head structure of power screwdriver, comprising a housing, an engaging clutch device and a driven member, the clutch device including a rotary seat, brake blocks, brake block springs, leaf springs, weight blocks and extension spring, wherein:

one end face of the driven member is disposed with an engaging block, the driven member being filled in an inner annular section of the rotary seat, a bottom face of the rotary seat being disposed with slide ways passing through the inner annular section, two sides of the slide ways being disposed with engaging boards for engaging with the brake block springs, the brake block springs being positioned in the engaging boards to insert the brake blocks in the slide ways to compress the brake block springs, the leaf springs being pivotally disposed to press upper ends of the brake block, the weight blocks being disposed on the leaf springs, the extension spring being connected between the two weight blocks, the entire body being installed in the housing; and after the rotary seat is coupled with the motor, at low rotational speed, only the rotary seat is rotated, while at high rotational speed, the weight blocks are subject to centrifugal force and moved outward, whereby the long ends of the weight blocks press the leaf springs to further press the brake blocks, whereby the slope blocks of the brake blocks are forced into the inner annular section of the rotary seat, the engaging block of the driven member being engaged with the slope block and drivingly rotated to tighten or untighten the screw.

2. A tool head structure as claimed in claim 1, wherein the rotary seat is formed with an inner annular section and two slide ways extending therethrough, two sides of the slide way being disposed with engaging boards for engaging with springs, one end of the rotary seat being disposed with an extending rotary seat disposed with laterally extending locating arms at a certain length, the rotary shaft being disposed with pin members near the slide ways.

3. A tool head structure as claimed in claim 1, wherein the brake block has a profile corresponding to that of the slide way of the rotary seat, the brake block being formed with slope block at the center and projecting blocks on two sides, the brake block springs being disposed between the projecting blocks and the engaging boards on two sides of the slide ways of the rotary seat.

4. A tool head structure as claimed in claim 1, wherein the slope blocks of the brake blocks are oppositely arranged with different rotational directions.

5. A tool head structure as claimed in claim 1, wherein the leaf spring is disposed with engaging hook section and pin hole and is arched, the pin member of the rotary seat being pivotally fitted in the pin hole.

6. A tool head structure as claimed in claim 1, wherein the weight block includes an upper half block and a lower half block which are respectively formed with corresponding cavities opposite to each other for receiving resilient members, top end of the upper half block being disposed with pin holes, bottom end of the lower half block being disposed with engaging bosses, the upper and lower half blocks being mated with each other by screws, whereby the upper and lower half blocks are resiliently extensible to each other.

7. A tool head structure as claimed in claim 1, wherein the upper and lower half blocks of the weight block are respectively formed with corresponding locating sockets in which a locating pin is fitted, whereby the upper and lower half blocks are lifted and lowered in alignment with each other.

8. A tool head structure as claimed in claim 3, wherein the slope blocks of the brake blocks are oppositely arranged with different rotational directions.

* * * * *